Feb. 11, 1941.                C. W. STRONG                 2,231,834
                        ELECTRICAL DISCONNECT DEVICE
                            Filed July 18, 1939
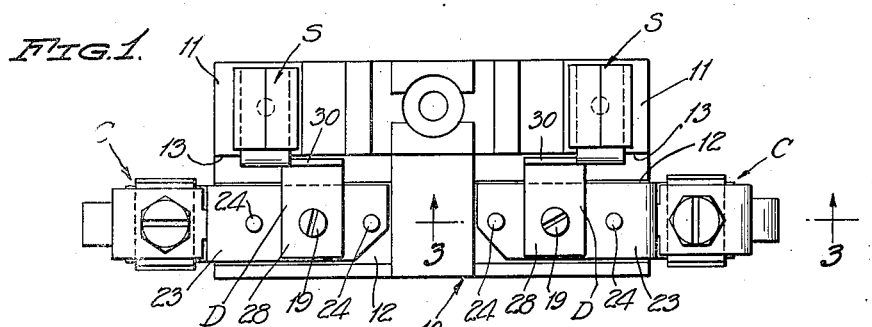
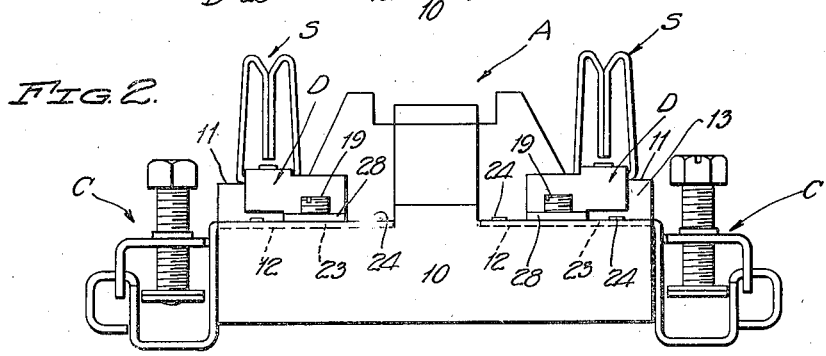
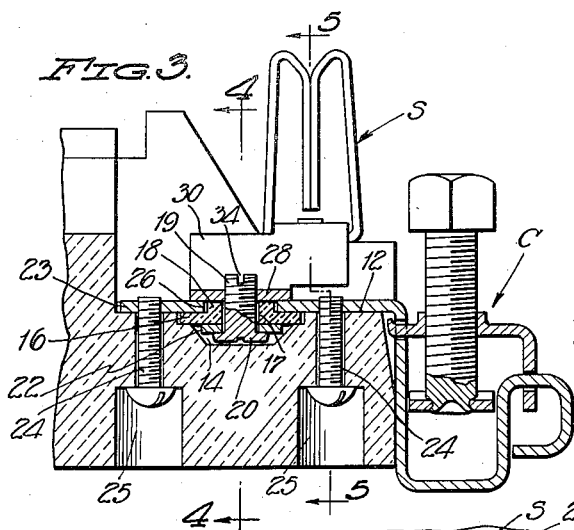
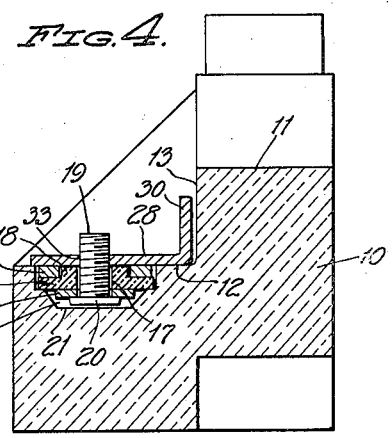
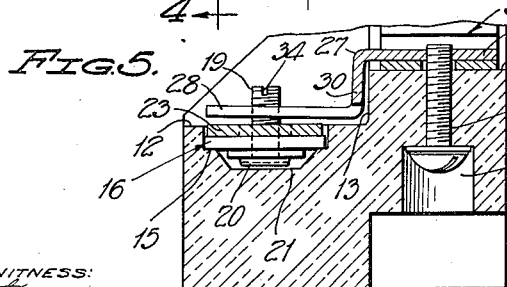
CARLL W. STRONG.
INVENTOR.
BY Ely & Pattison
ATTORNEYS.

Patented Feb. 11, 1941

2,231,834

UNITED STATES PATENT OFFICE 2,231,834

ELECTRICAL DISCONNECT DEVICE

Carll W. Strong, Atlanta, Ga., assignor to Walker Electrical Company, Atlanta, Ga., a corporation of Georgia Application July 18, 1939, Serial No. 285,044

3 Claims. (Cl. 200—158)

This invention relates to improvements in disconnect devices for use upon electrical apparatus.

The main object of the invention resides in an electrical disconnect device for use upon electrical meters of the socket type to facilitate the breaking of an electric supply circuit to shut off electrical power to a dwelling by an authorized representative of an electric power supply company without disturbing any of the parts constituting the socket installation, thus all parts are available at the meter box when the disconnect device is adjusted to effect resumption of electric service.

A further feature of the invention is to provide an electric disconnect device which may be actuated to effect a disconnection of an electric circuit and for effecting a subsequent electrical connection of a circuit by the use of a screw driver, thus making it unnecessary for an electrician to carry special tools for such purposes.

A further feature of the invention is the provision of an electrical disconnect which is exceptionally simple of construction, easy of assembly, and which is deceptive in appearance when adjusted to effect a disconnection of electric power service to frustrate attempts by unauthorized persons to adjust the device for resumption of electric power service.

Other novel features will be apparent as the following specification is read in conjunction with the accompanying drawing, in which:

Figure 1 is a front elevational view of a terminal block for socket type electric meters with the disconnect device operatively associated therewith.

Figure 2 is a side elevational view with the disconnect device in circuit closing position.

Figure 3 is an enlarged detail horizontal sectional view on the line 3—3 of Figure 1, the disconnect device being in circuit closing position.

Figure 4 is a vertical transverse sectional view on the line 4—4 of Figure 3.

Figure 5 is a vertical sectional view taken on the line 5—5 of Figure 3 but illustrating the disconnect device in circuit disconnecting position.

Figure 6 is a detail perspective view of the screw insulating element.

Referring to the drawing by reference characters, the letter A designates the socket unit of an electric meter installation of the socket type and which includes a base 10 of dielectric material having flat offset surfaces 11 and 12 with a flat right angle surface 13 therebetween. Mounted on the flat surfaces 11 are a pair of socket contact members S—S which in use, receive the terminal blades of an electric meter of the socket type. Mounted on the stepped surfaces 12 and projecting upon the ends of the base 10 are wire terminal connector devices C—C. The terminal connector devices C—C are respectively connected or disconnected from the socket contact members S—S by my novel disconnect devices D—D and in view of the fact that the disconnect devices D—D are of identical construction, a description of one will suffice for the other.

Each disconnect device D includes a recess 14 provided in the surface 12 which has a square portion defining a seat 15 against which a square block 16 of fibre or other dielectric insulating material is held seated. The block 16 is provided with a central opening 17 and surrounding the opening and projecting beyond the outer side of the block is an annular flange 18 which extends beyond the surface 12. A screw 19 has its threaded shank freely passing through the opening 17 and has a flat head 20 resting upon the flat inner wall 21 of the recess 14. A copper washer 22 is interposed between the head 20 of the screw and the inner flat side of the block 16.

The wire terminal connector device C includes a flat copper attaching arm 23 which may be termed a fixed contact member and the same is seated upon the flat surface 12 and fixedly secured thereto by screws 24—24 passing outwardly from recesses 25—25 is the base 10. The contact arm 23 is provided with an opening 26 into which the flange 18 extends. The block 16 and flange 18 serve to electrically insulate the screw 19 from the contact arm 23.

Bridging the space between the contact arm 23 and the socket contact member S is a flexible bridge contact member 27 preferably made of copper, which is of Z-shape to provide flat offset arms 28 and 29 and an angular intermediate portion 30. The arm 29 overlies the base of the socket contact member S and is secured directly thereto by a screw 31 which extends through a recess 32 in the base end through an opening in the base of the member S. The angular intermediate portion 30 is disposed substantially parallel to the wall or surface 13 while the arm 28 extends in overlapping crossed relation to the contact arm 23 of the device C. The arm 28 is provided with a screw threaded opening 33 with which the shank of the screw 19 threadedly engages. The free end of the shank of the screw passes through the threaded opening 33 and is provided with a kerf 34 in which a screw driver or other blade instrument may be inserted and the screw manually turned.

In practice, assume that it is desirous to effect an electrical connection from the terminal connector C to its related socket member S. The operator inserts the blade of a screw driver in the kerf 34 and imparts a turning movement in a direction which will cause the arm 28 of the bridge member 27 to flex into and be held clamped flat against the contact arm 23, it being understood that the head end of the screw is swively mounted within the recess 14. With the arms 28 and 23 of each disconnect device D in contacting engagement, both socket members S—S are respectively connected with the terminal electric feed wire connectors C—C and with the blades of the meter disposed within the socket members S—S, electrical service is established to an electric current subscriber. Should the electric supply company wish to interrupt the service to a subscriber, the authorized representative of such company need only apply a screw driver to the kerf of either or both of the screws 19 and turn the same in a direction to cause the flexible contact arm 28 to back away from the contact arm 23 as illustrated in Figure 5 of the drawing, whereupon a disconnect of electric service to a dwelling is effected. The position of the screw 19 after effecting a disconnect imparts the appearance that an electrical connection exists between the contact arms 23 and 28 which is deceiving to a layman who may unscrupulously try and restore electric service to the meter which has been disconnected by the electric supply company. It will be noted that when effecting a "disconnect," no parts of the device are removed and thus no replacements are required when restoration of electric service is ordered.

While I have shown and described what I consider to be the preferred embodiment of my invention, I wish it to be understood that such changes in construction and design as come within the scope of the appended claims may be resorted to if desired.

Having thus described the invention, what I claim as new and desire to secure by Letters Patent of the United States, is:

1. An electrical apparatus including a base of dielectric material having a pair of offset flat surfaces, an electric wire terminal connector disposed at one side of said base and having a flat contact portion fixedly secured to one of the flat surfaces of said base, a terminal member fixed to the other flat surface of said base, a flat Z-shaped flexible bridge conductor element having one of its ends fixedly secured to said terminal member and its other offset end lapping said flat contact portion, screw means mounted on said base for flexing said bridge conductor element into contacting engagement with said contact portion to electrically connect said wire terminal connector and said terminal member, or for flexing said bridge conductor element away from said contact portion to effect an electrical disconnect between said wire terminal connector and said terminal member, and means insulating said screw means from said contact portion.

2. An electrical disconnect device comprising in combination, a flat base of dielectric material having a recess provided therein, a flat contact member fixed to said base and overlying said recess, said contact member having an opening therein in alinement with said recess, an insulating element seated in said recess and having a portion thereof extending into said opening, said insulating member having an opening extending therethrough, a screw freely extending through the last mentioned opening, a head on the inner end of said screw disposed within said recess, a second flat contact member fixed to said base having a free flexible portion overlying the opening in the first contact member, said flexible portion having a threaded opening therein with which said screw is threadedly connected, and manipulating means at the outer end of said screw by which the same may be manually turned to cause the free flexible portion of the second contact member to be moved into or out of contacting engagement with the first mentioned contact member.

3. An electrical disconnect device comprising in combination, a base of dielectric material having a recess provided therein, a contact member fixed to said base and overlying said recess, said contact member having an opening therein in alinement with said recess, a screw freely passing through said opening in spaced relation to the walls thereof, a swivel head on the inner end of said screw disposed in said recess, means for insulating the head of said screw from said contact member, a second contact member fixed to said base having a free resilient portion overlying the opening in the first mentioned contact member, said resilient portion having a threaded opening therein with which said screw is threadedly connected, and manipulative means at the outer end of said screw by which the same may be manually turned to cause the free resilient portion of the second contact member to be flexed into and out of contacting engagement with the first contact member.

CARLL W. STRONG.